United States Patent
Hutin

(10) Patent No.: US 9,138,603 B2
(45) Date of Patent: Sep. 22, 2015

(54) ROPE ADJUSTER WITH FAST ROPE REPLACEMENT DEVICE

(75) Inventor: Renaud Hutin, Quincy (FR)

(73) Assignee: Honeywell International Inc., Morristown, NJ (US)

( * ) Notice: Subject to any disclaimer, the term of this patent is extended or adjusted under 35 U.S.C. 154(b) by 274 days.

(21) Appl. No.: 13/403,712

(22) Filed: Feb. 23, 2012

(65) Prior Publication Data
US 2013/0219671 A1 Aug. 29, 2013

(51) Int. Cl.
*B65H 59/16* (2006.01)
*A62B 1/14* (2006.01)
*A47L 3/04* (2006.01)
*F16D 63/00* (2006.01)

(52) U.S. Cl.
CPC ............... *A62B 1/14* (2013.01); *F16D 63/008* (2013.01); *Y10T 24/3944* (2015.01)

(58) Field of Classification Search
CPC ......... A62B 1/14; F16D 63/00; F16D 63/008; Y10T 24/3944
USPC ............ 188/65.1, 65.2, 65.4, 65.5; 182/5, 71, 182/191; 254/39, 405, 406
See application file for complete search history.

(56) References Cited

U.S. PATENT DOCUMENTS

| | | | |
|---|---|---|---|
| 4,596,314 A * | 6/1986 | Rogelja | 188/65.5 |
| 5,076,400 A * | 12/1991 | Petzl et al. | 188/65.5 |
| 5,577,576 A * | 11/1996 | Petzl et al. | 188/65.4 |
| 5,850,893 A | 12/1998 | Hede et al. | |
| 6,263,999 B1 * | 7/2001 | Atkinson et al. | 182/5 |
| 6,378,650 B2 * | 4/2002 | Mauthner | 182/5 |
| 6,732,833 B2 * | 5/2004 | Rogelja | 182/5 |

FOREIGN PATENT DOCUMENTS

| | | |
|---|---|---|
| GB | 2 438 018 A | 11/2007 |
| WO | 2010/049597 A1 | 5/2010 |
| WO | 2012/001661 A1 | 1/2012 |

OTHER PUBLICATIONS

English Machine Translation of WO 2010/049597.*
European Search Report dated Nov. 27, 2014.

* cited by examiner

*Primary Examiner* — Melody Burch
(74) *Attorney, Agent, or Firm* — Wood, Phillips, Katz, Clark & Mortimer

(57) ABSTRACT

A rope adjuster device (14) is provided for allowing adjustable positioning of a load along a rope (12) extending through the device and includes a rope bite (20), a cam carrier (22), and a frame (24). The bite is open on a lateral side (32) to allow loading of the rope into the bite by moving the rope laterally with respect to the length (26) of the rope. The frame defines a connector opening (60) to receive a load connector for attaching a load to the device. The frame extends from the opening (60) to a pivot location (62) whereat the cam carrier is connected to pivot relative to the frame between an open position wherein a rope can be loaded from the lateral side and a closed position wherein the lateral side is closed by the frame to prevent removal of the rope.

13 Claims, 10 Drawing Sheets

ROPE ADJUSTER WITH FAST ROPE REPLACEMENT DEVICE

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

This disclosure relates to devices that allow adjustable positioning along a length of rope, and in more particular applications to fall protection equipment in the form of work positioning lanyards.

BACKGROUND

One type of fall protection equipment is work positioning lanyards. Such lanyards typically include a rope and an adjuster with the rope having terminations in the form of spliced eyelets at its ends that allow for attachment of a suitable connector and the adjuster having a cam that allows a user to set the length of the lanyard by moving the rope through the adjuster. The rope often becomes abraded over time from contact with the support, such as contact with a metallic beam, wooden frame, tree, etc. Because of this, the useful life of the rope is typically much shorter than the useful life of the adjuster. Most conventional adjusters are assembled with permanent connections, such as by rivets, and accordingly offer no provisions for replacing the worn rope with a new rope because the terminations at its end prevent it from threading through the adjuster. One currently available adjuster, produced and sold under the trademark GRILLION by the PETZL company, provides for the replacement of a worn rope, but requires that a user remove a screw and the load connecting carabiner used to attach the adjuster to a user. Safety concerns associated with modification/disassembly of personal protection equipment (PPE) require that such an operation be performed in a workshop.

SUMMARY

In accordance with one feature of the disclosure, a rope adjuster device is provided for allowing adjustable positioning of a load along a rope extending through the device and providing convenient replacement of the rope. The rope adjuster device includes a rope bite, a cam carrier, and a frame. The rope bite has a first state wherein a rope extending through the device is gripped to prevent translation of the device along the length of the rope and a second state wherein the device may translate along the length of the rope, the rope bite being defined by a rope guide surface and a bite cam that is movable relative to the rope guide surface between a gripping position wherein a rope is gripped between the bite cam and the rope guide surface in the first state and a release position wherein a rope may translate through the bite along the length of the rope in the second state. The rope bite is open on a lateral side to allow loading of a rope into the bite by moving the rope laterally with respect to the length of the rope. The cam carrier defines the rope guide surface, and the bite cam is mounted on the cam carrier for movement between the gripping and release positions. The frame defines a connector opening to receive a load connector for attaching a load to the rope adjuster device. The frame extends from the connector opening to a pivot location whereat the cam carrier is connected to the frame to pivot relative to the frame between an open position wherein a rope can be loaded from the lateral side into the rope bite and a closed position wherein the lateral side is closed by the frame to prevent removal of a rope from the rope bite. The cam carrier being spaced from the connector opening with the cam carrier in the closed position to allow movement of the cam carrier from the closed position to the open position with a load connector received in the connector opening.

As one feature, the bite cam is mounted on the cam carrier to pivot between the gripping and release positions.

According to one feature, the bite cam is biased to pivot toward the gripping position.

In one feature, the cam carrier includes a rigid lever member extending from the bite cam to the pivot location, the lever member operable by a user to place the rope bite in the second state by pivoting the cam carrier relative to the bite cam to move the rope guide surface away from the bite cam with a rope extending through the device and under load.

According to one feature, the frame includes a one-piece, rigid member extending from the connector opening to the pivot location.

As one feature, the rigid member extends over the lateral side of the rope bite with the cam carrier in the closed position.

In one feature, the frame includes another rigid member extending from the connector opening to the pivot location, the rigid members extending over opposite lateral sides of the cam carrier with the cam carrier in the closed position.

As one feature, the cam carrier includes a protrusion extending outwardly beyond the rigid members with the cam carrier in the closed position, the protrusion engageable by a user to move the cam carrier from the closed position toward the open position.

As one feature, the rigid members define rope conforming surfaces adjacent the connector opening to guide a rope past the frame when the cam carrier is moved from the open position to closed position with a rope loaded into the bite cam.

According to one feature, the rigid members are fixed to each other at the connector opening.

As one feature, device further includes a grommet defining the connector opening and fixing the rigid members to each other.

In one feature, the cam carrier is biased to the closed position.

According to one feature, the device further includes a spring extending between the frame and the cam carrier at the pivot location to bias the cam carrier to the closed position.

In one feature, the connector opening is spaced further from the pivot location than the bite cam.

According to one feature of the disclosure, the device is combined with a rope extending through the device and engaged in the rope bite.

Other features and advantages will become apparent from a review of the entire specification, including the appended claims and drawings.

DETAILED DESCRIPTION

Figure 1:
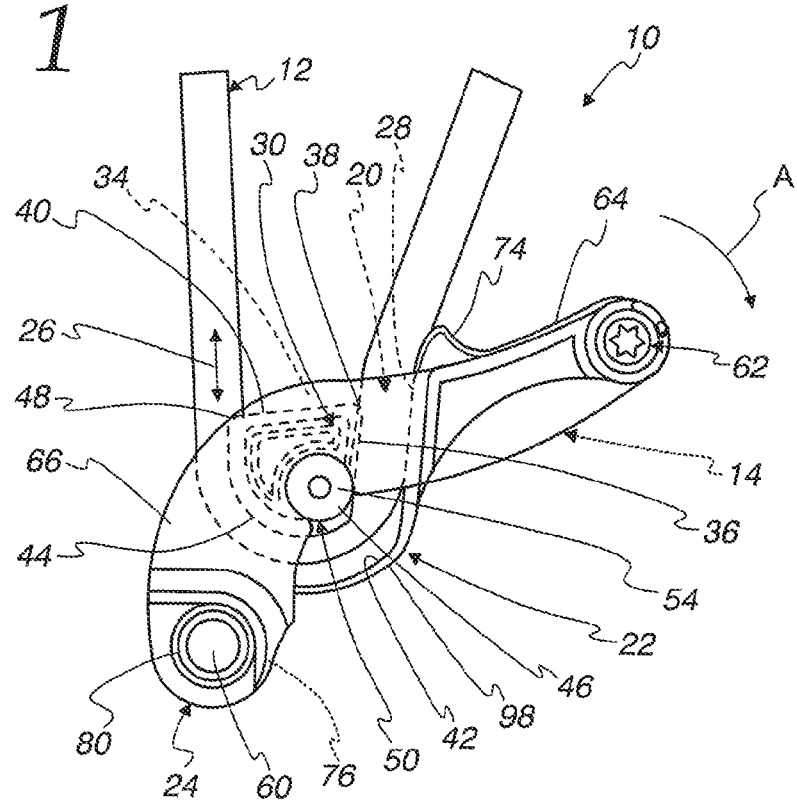
FIG. 1 is a view from one lateral side of a work positioning lanyard including a rope adjuster device in a closed condition according to this disclosure, with the device shown in a first state wherein a lanyard rope extending through the device is gripped to prevent translation of the device along the rope.
Figure 2:
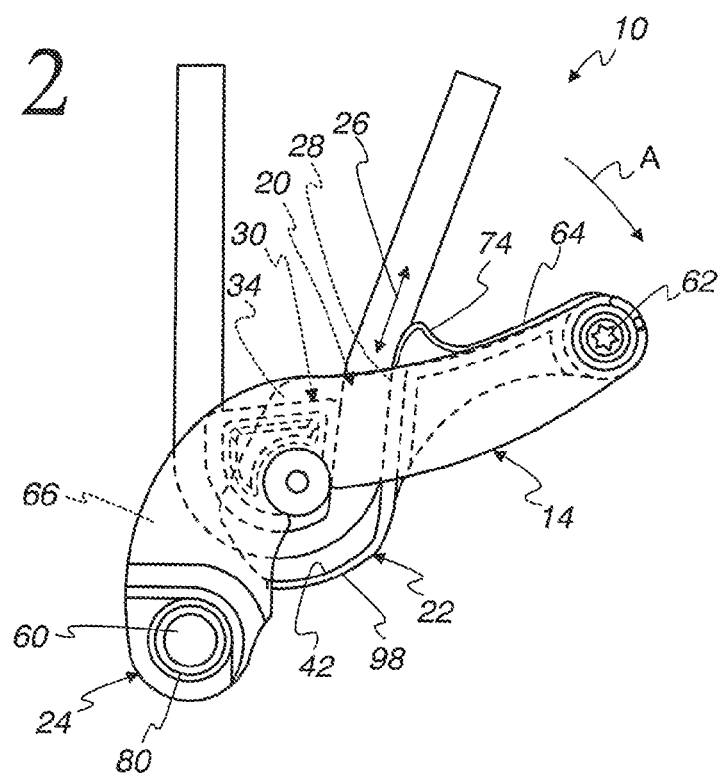
FIG. 2 is a view similar to FIG. 1, but showing the device in a second state wherein the device may translate along the rope.
Figure 3:
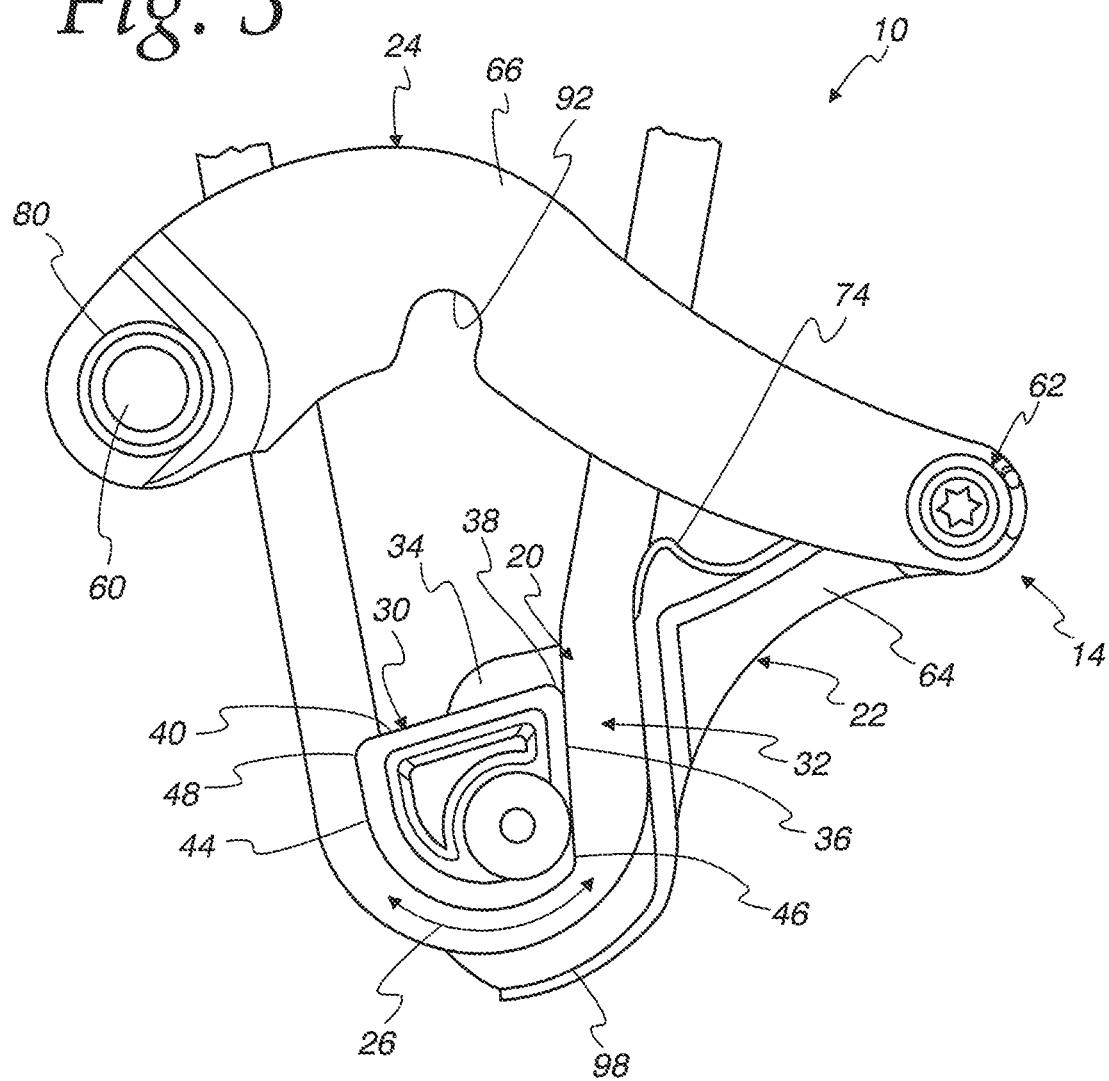
FIG. 3 is a view similar to FIGS. 1 and 2, but showing the device in an open position wherein a lanyard rope may be loaded into and out-of the device by moving the rope laterally with respect to the length of the rope.

With reference to FIGS. 1-3, a work positioning lanyard 10 is shown and includes a rope 12 and a rope adjuster device 14. The rope 12 can be of any suitable and known type and construction and can include terminations at its end in the form of eyelets (not shown) that are formed by splicing the rope 12 to itself or by other suitable and known means, such as by a mechanical splice. The adjuster device 14 allows for the working length of the lanyard 10 to be adjusted to provide a desired positioning of a user who is attached as a load to the lanyard 10 by the adjuster device 14. In this regard, the adjuster device 14 has a first state (FIG. 1) wherein the device 14 is prevented from translating along the rope 12 to maintain a user in a current position and a second state (FIG. 2) wherein the device 14 can translate along the rope to allow a user to alter their current position.

The adjuster device 14 includes a rope bite 20, a cam carrier 22, and a frame 24. The rope bite 20 has a first state (FIG. 1) wherein the rope 12 is gripped to prevent translation of the device 14 along the length 26 of the rope 12 and a second state (FIG. 2) wherein the device 14 may translate along the length 26 of the rope 12. In this regard, the rope bite 20 is defined by a rope guide surface 28 and a bite cam 30 that is movable relative to the rope guide surface 28 between a gripping position (FIG. 1) wherein the rope 12 is gripped or clamped between the bite cam 30 and the rope guide surface 28 in the first state of the bite 20 and a release position (FIG. 2) wherein the rope 12 may translate through the bite 20 along the length 26 of the rope 12 in the second state of the bite 20.

Figure 4:
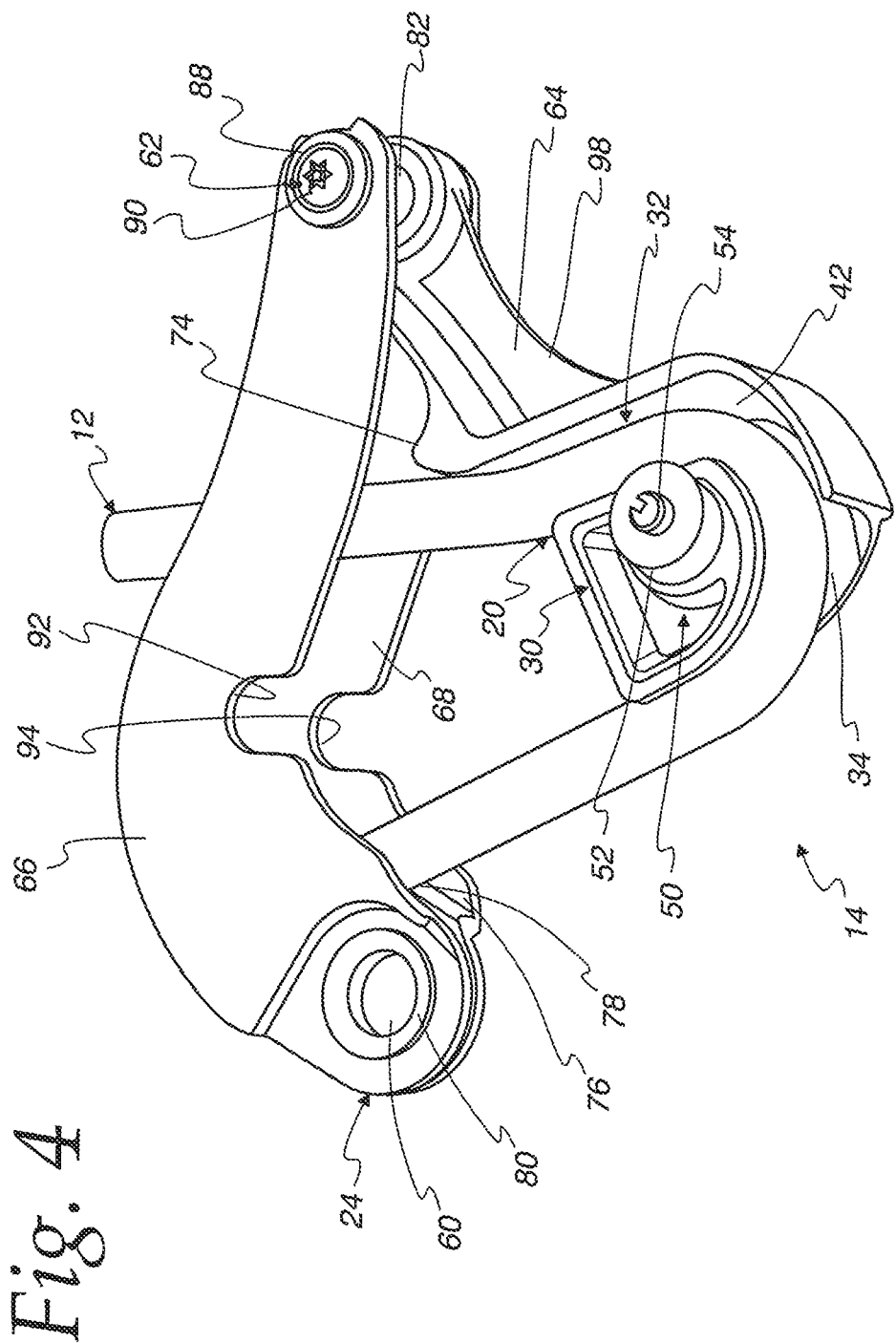
FIG. 4 is a perspective view of the device in the open condition, with selected component.

The cam carrier 22 defines the rope guide surface 28, and the bite cam 30 is mounted on the cam carrier 22 for movement between the gripping and release positions. In this regard, it can be seen that, as viewed in FIGS. 1 and 2, the cam 30 pivots counterclockwise from the gripping position shown in FIG. 1 to the release position shown in FIG. 2, and clockwise from the release position shown in FIG. 2 to the gripping position shown in FIG. 1, with increased clockwise motion producing increased gripping or clamping of the rope 12 by the cam 30 and the surface 28. As best seen in FIGS. 3 and 4, the rope bite 20 is open on a lateral side 32 to allow loading of the rope 12 into the bite 20 by moving the rope 12 laterally (in and out of the page) with respect to the length 26 of the rope 12. The opposite lateral side of the bite 20 is closed by a wall surface 34 of the cam carrier 22 that prevents the rope 12 from being loaded laterally past the bite 20. In the illustrated embodiment, the guide surface 28 is planar and the cam 30 defines a planer surface 36 spaced opposite the surface 28 that terminates in a corner surface 38 that adjoins another planer surface 40 defined by the cam 30 in the bite 20. In the illustrated embodiment, the planar rope guide surface 28 extends to a curved rope guide surface 42 defined by the cam carrier 22, with both the surfaces 28 and 42 extending laterally from the wall surface 34 of the carrier 22.

The cam 30 of the illustrated embodiment also defines a curved rope guide surface 44 that extends between a corner surface 46 adjoining the surface 36 and a corner surface 48 that adjoins the surface 40. The surface 44 can be provided as a conforming groove having a transverse cross-section that is preformed so as to conform to the diameter of the rope 12. While any suitable pivot mounting can be used, as best seen in FIG. 4 of the illustrated embodiment, the cam 30 is mounted to a cantilevered post or stud 50 of the cam carrier 22 to pivot about the post/stud 50 between the gripping and release positions, with a torsion spring 52 being preloaded between the post/stud 50 and the cam 30 to bias the cam 30 to the gripping position. A suitable threaded fastener, such as the fastener 54, can be provided to retain the cam 30 and spring 52 in the assembled state on the post/stud 50 of the cam carrier 22.

Figure 5:
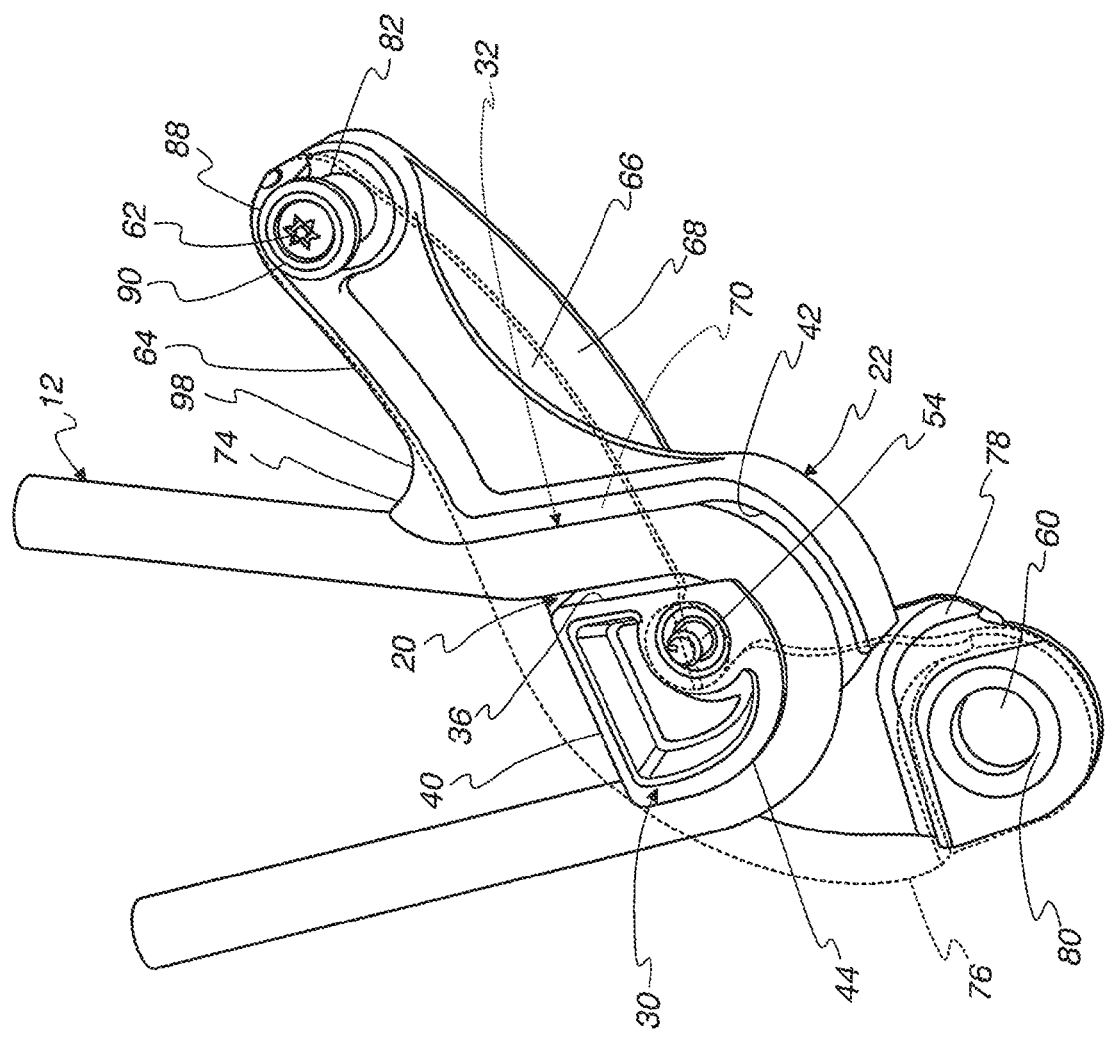
FIG. 5 is a perspective view of the device in the closed condition, with selected exterior components shown in phantom to allow better illustration of the selected interior components.

The frame 24 defines a connector opening 60 to receive a suitable load connector, such as a carabiner, for attaching a user, typically by connection to a harness by a user, to the rope adjuster device 14. The frame 24 extends from the connector opening 60 to a pivot location 62 whereat the cam carrier 22 is connected to the frame 24 to pivot relative to the frame 24 between an open position (FIGS. 3 and 4) wherein the rope 12 can be loaded from the lateral side 32 into the rope bite 20 and a closed position (FIGS. 1, 2, and 5) wherein the lateral side 32 is closed by the frame 24 to prevent removal of the rope 12 from the rope bite 20. In the illustrated embodiment, the connector opening 60 is spaced further from the pivot location 62 than the bite cam 30 and the cam 30 is mounted to the cam carrier 22 so that it is positioned between the opening 60 and the bite 20 with the cam carrier in the closed position, as best seen in FIG. 1. As seen in FIGS. 1, 2, and 5, the cam carrier 22 is spaced from the connector opening 60 with the cam carrier 22 in the closed position to allow movement of the cam carrier 22 from the closed position to the open position even with a load connector received in the connector opening 60.

The cam carrier 22 includes a rigid lever member 64 extending from the bite cam 30 to the pivot location 62. As indicated by the clockwise directed arrow A in FIGS. 1 and 2, the rigid lever member 64 is operable, such as by gripping or pushing the member 64 with a user's hand, to place the device 14 in the second state and the rope bite 20 in the release position state by pivoting the cam carrier 22 relative to the bite cam 30 to move the rope guide surface 28 away from the bite cam 30 with the rope 12 under load. This allows a user to adjust their work position even with the lanyard 10 bearing all or part of the weight of the user.

As best seen in FIGS. 4 and 5, the frame 24 of the illustrated embodiment includes first and second rigid members 66 and 68, each extending from the connector opening 60 to the pivot location 62. Each of the members 66 and 68 can be formed as one-piece component, such as by stamping the member 66 or 68 from a single piece of sheet metal. As best seen in FIG. 5, the rigid members 66 and 68 extend over opposite lateral sides 70 (only one side 70 visible in FIG. 5) of the cam carrier 22 in the closed position, with the rigid member 66 extending over the open side 32 of the cam bite 20 to close the side 32 to prevent removal of the rope 12 from the bite 20. In this regard, the cam carrier can include a protrusion, such as the finger or thumb engageable protrusion 74, extending outwardly beyond the rigid members 66 and 68 in the closed position to allow a user to move the cam carrier 22 from the closed position toward the open position. In the illustrated embodiment the rigid members 66 and 68 define curved, rope conforming surfaces 76 and 78 adjacent the connector opening 60 to guide the rope past the frame 24 when the cam carrier 22 is moved between the open and closed positions. The rigid members 66 and 68 can be fixed to each other at the connector opening 60 to form a permanently joined assembly, such as by the shouldered grommet 80 that defines the opening 60 in the illustrated embodiment.

While any suitable pivot mounting can be used at the pivot location 62, as best seen in FIGS. 4 and 5 of the illustrated embodiment, the rigid members 66 and 68 and the cam carrier 22 can be journal mounted to each at the pivot location 62, such as by a journal post 82 extending from the cam carrier 22 to be received in respective journal openings formed in the rigid members 66 and 68, with the members 66 and 68 being retained by a suitable washer and threaded fastener, such as the washer 88 and fastener 90 of the illustrated embodiments. The cam carrier 22 can be biased to the closed position using any suitable means, such as a suitable torsion spring preloaded between the cam carrier 22 and the frame 24.

As best seen in FIGS. 4 and 5, the rigid members 66 and 68 include curved internal shoulders 92 and 94, respectively, that can engage the post/stud 50, or extensions therefrom, on opposite lateral sides of the cam carrier 22 to transfer loads between frame 24 and cam carrier 22 when the adjuster device 14 is under load, such as when a load connector is transferring load to the connector opening 60 and the rope 12 is transferring load to the cam 30 and the surface 28.

Another embodiment of the device 14 is shown in FIGS. 6-14, with like reference numbers indicating like components. The device 14 of FIGS. 6-14 differs from the device 14 of FIGS. 1-5 in that: (a) the rigid members 66 and 68 of the frame 24 include guard portions 100 and 102 that allow the frame 24 to provide full coverage over the cam carrier 22 and the portion of the rope 12 passing therethrough with the device 14 in the closed condition; (b) a contoured handle component 104 (best seen in FIG. 8) is fixed between the frame components 66 and 68 to provide a more contoured surface for a user's hand during operation of the device 14 and to further provide a surface/wall 106 that extends over the bite 20 to help retain the rope 12 within the bite 20 with the device 14 in the closed condition; (c) a rivet 108 extends through a tunnel 109 in the handle 104 and sandwiches the handle 104 between the frame components 66 and 68 to reinforce/strengthen the frame 24; and (d) the washer 88 and fastener 90 of the embodiment of FIGS. 1-5 has been replaced with a riveted post 110 at the pivot location 62.

Figure 6:
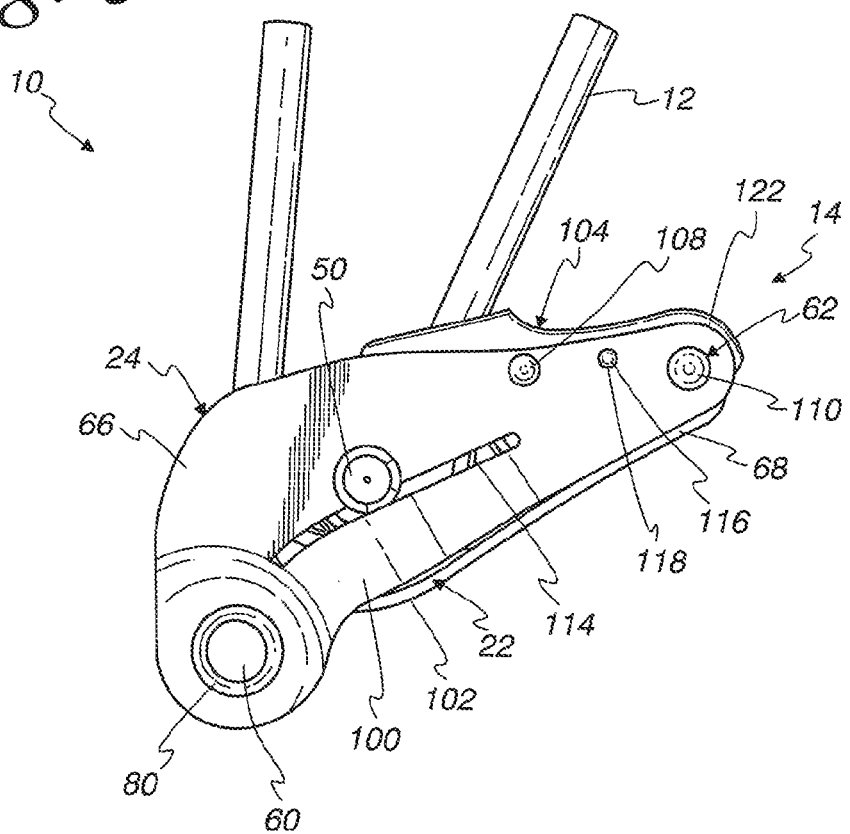
FIG. 6 is a view from one lateral side of another embodiment of a work positioning lanyard in a closed condition according to this disclosure.
Figure 8:
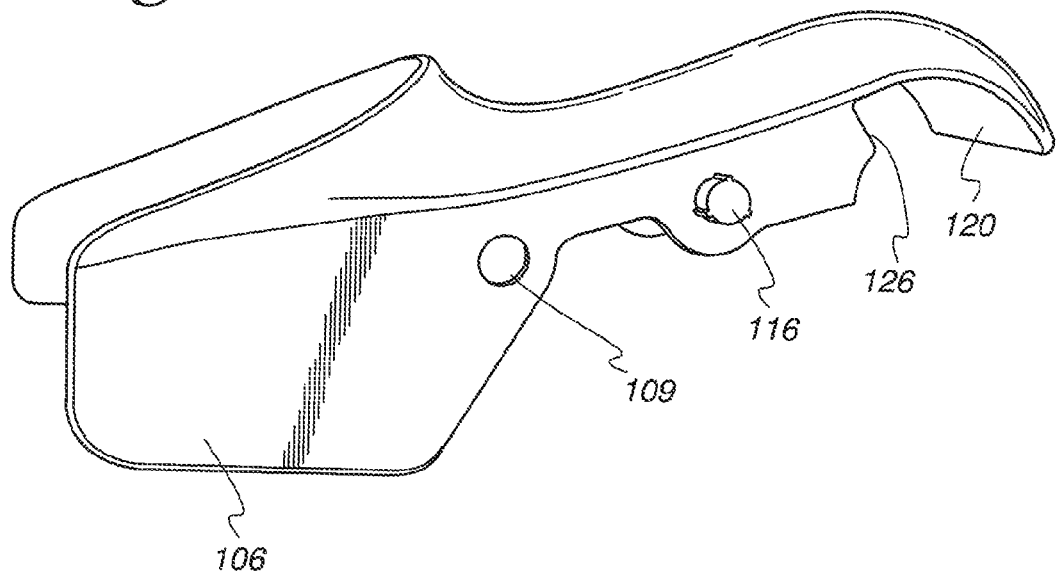
FIG. 8 is an enlarged perspective view of a component of the device of FIGS. 6 and 7.
Figure 7:
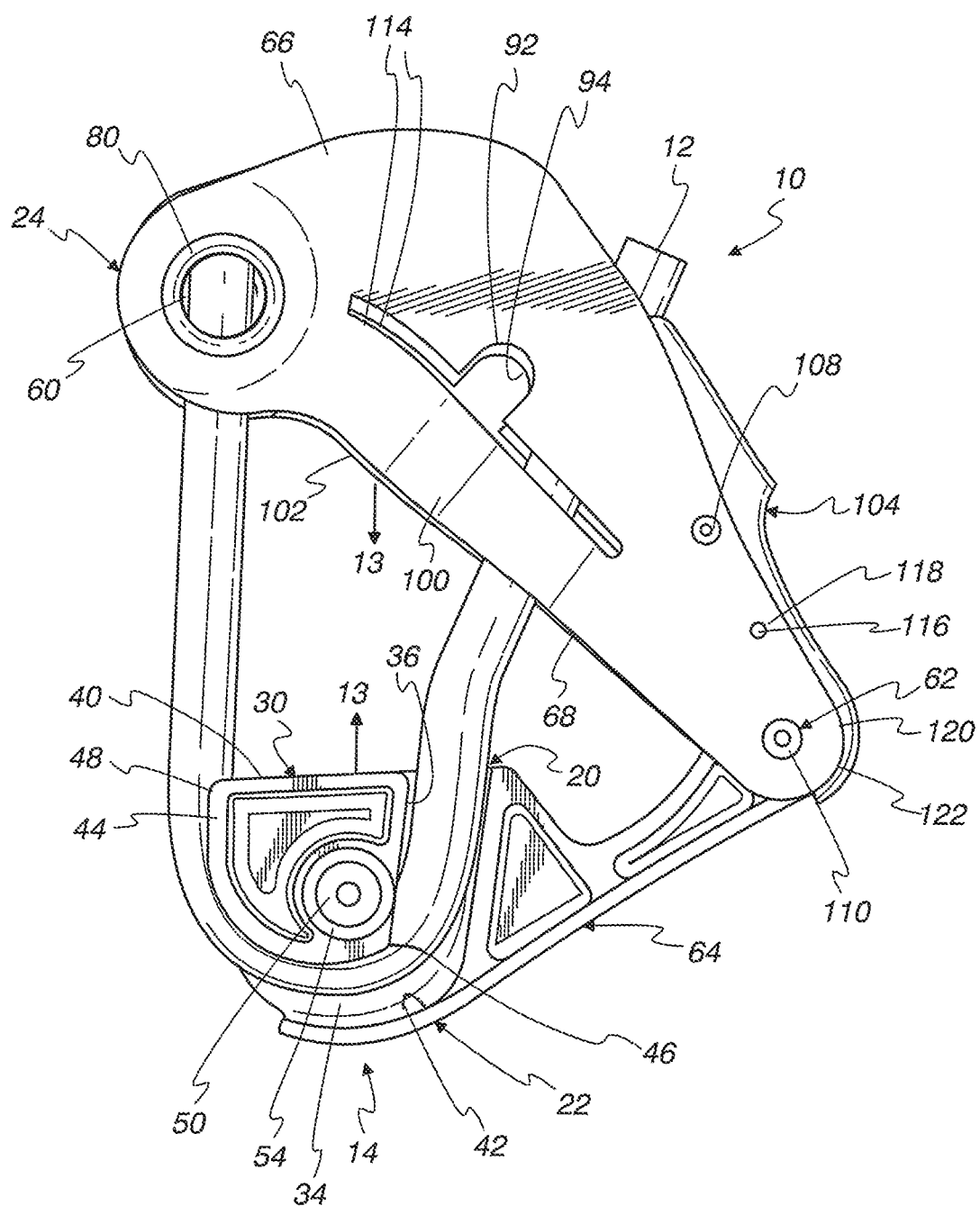
FIG. 7 is a view similar to FIG. 1 but showing the device in an open position wherein a lanyard rope may be loaded into and out of the device by moving the rope laterally with respect to the length of the rope.

As best seen in FIGS. 6 and 7, the guard portions 100 and 102 extend laterally outwardly so that the guard portions 100 and 102 will clear the post/stud 50 and fastener 54 on the cam carrier 22 as the device 14 is pivoted between the open and closed positions. In this regard, each of the frame components 66 and 68 includes an elongate slot 114 that allows the guard portions 100 and 102 to be embossed laterally outwardly.

Figure 9:
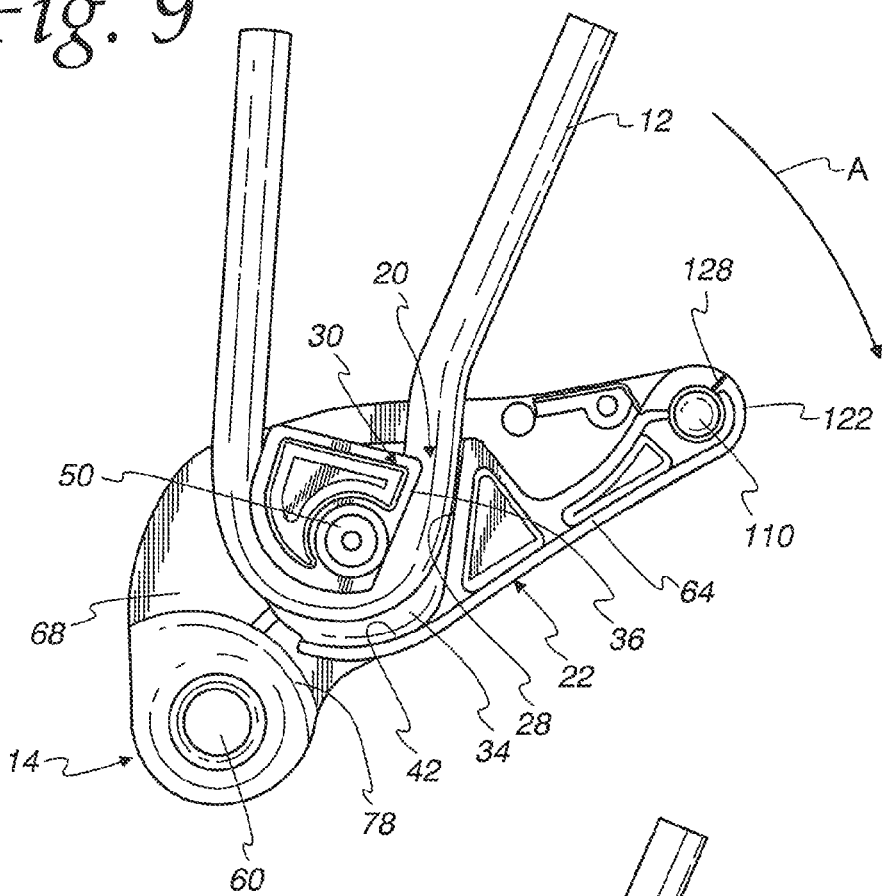
FIG. 9 is a view from one lateral side of the device of FIGS. 6-8 in the closed condition, with some of the components of the device removed for purposes of illustration and the device shown in a first state wherein a lanyard rope extending through the device is gripped to prevent translation of the device along the rope.
Figure 10:
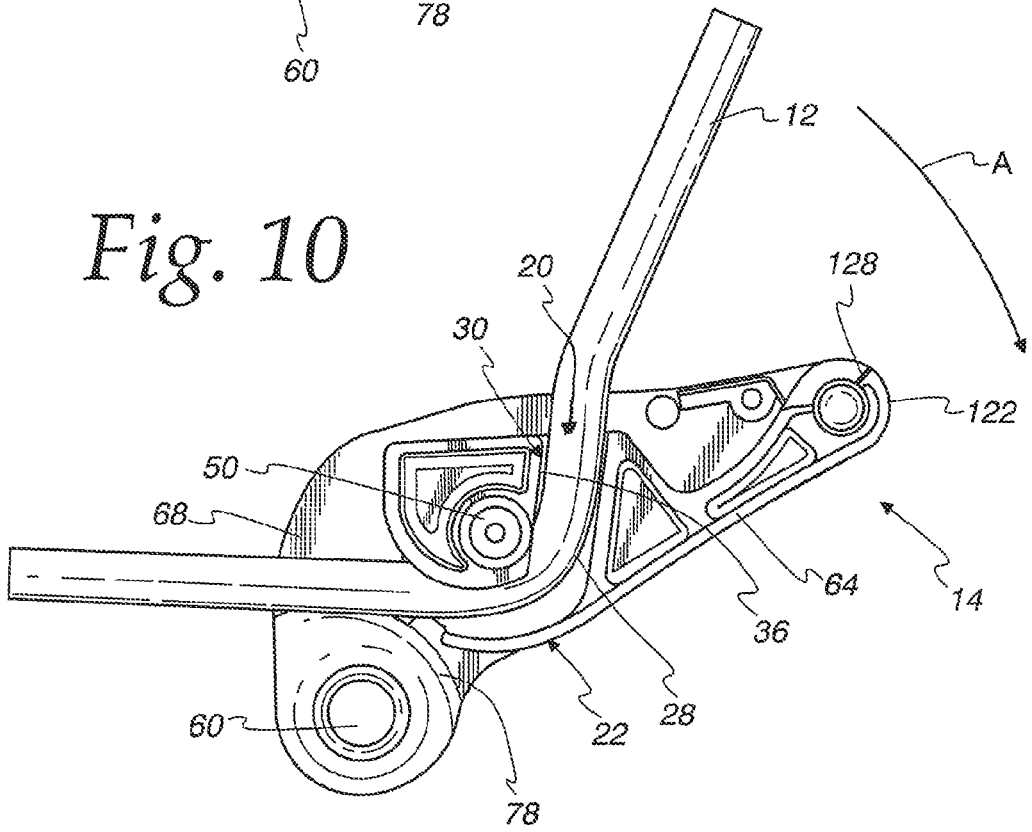
FIG. 10 is a view similar to FIG. 9, but showing the device in a second state wherein the device may translate along the rope.
Figure 11:
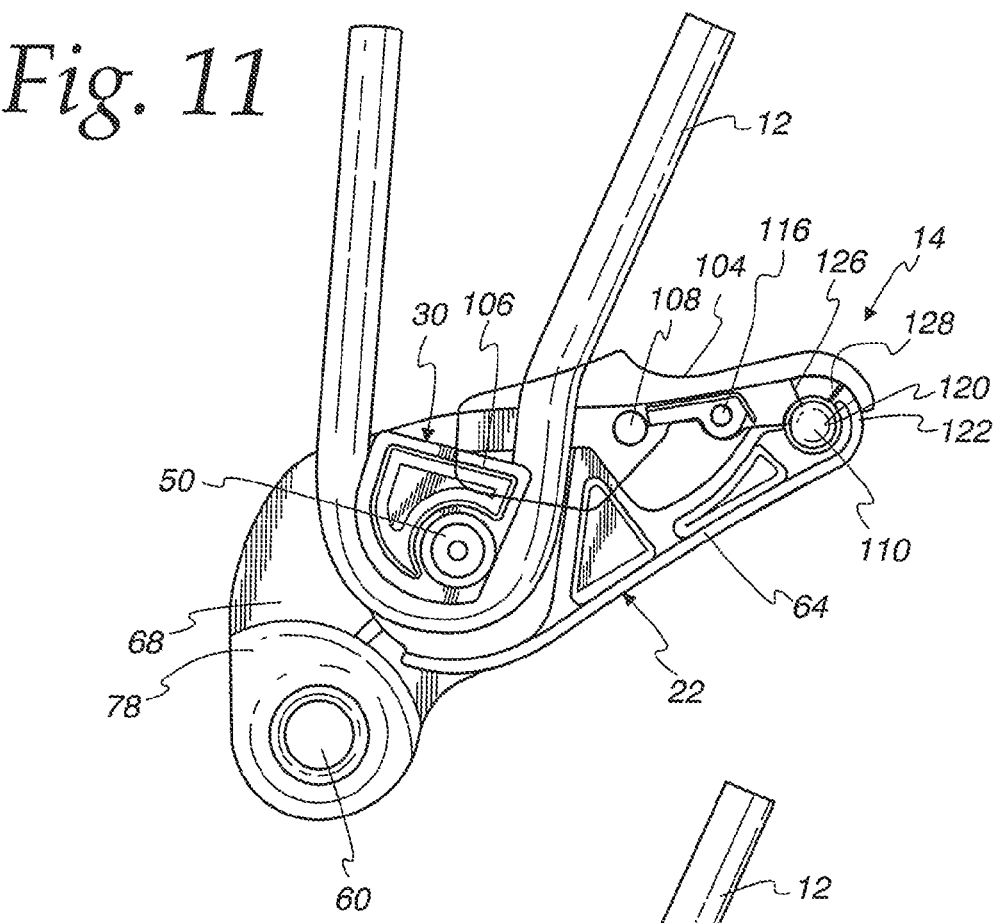
FIG. 11 is a view similar to FIG. 9 but showing the component of FIG. 8 in its installed condition and with a frame element of the device again removed for purposes of illustration.
Figure 12:
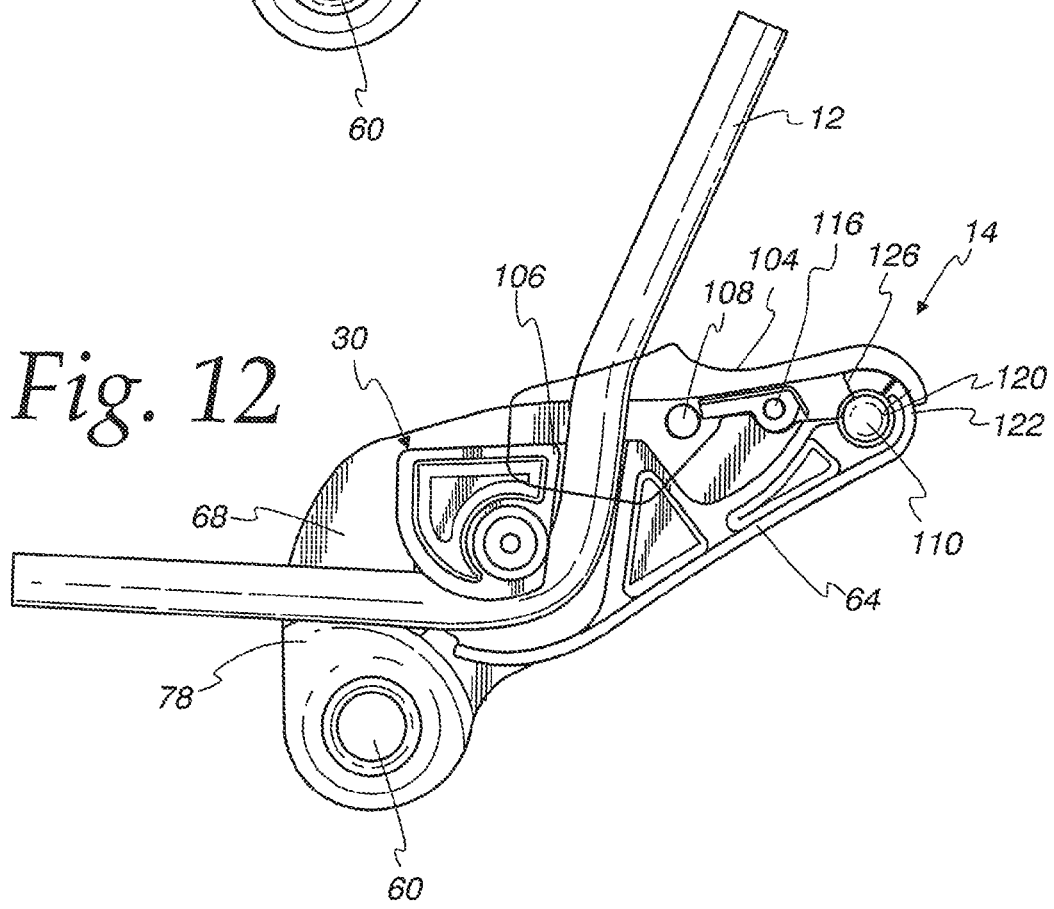
FIG. 12 is a view similar to FIG. 10 but again showing the component of FIG. 8 and with a frame element removed for purposes of illustration.
Figure 13:
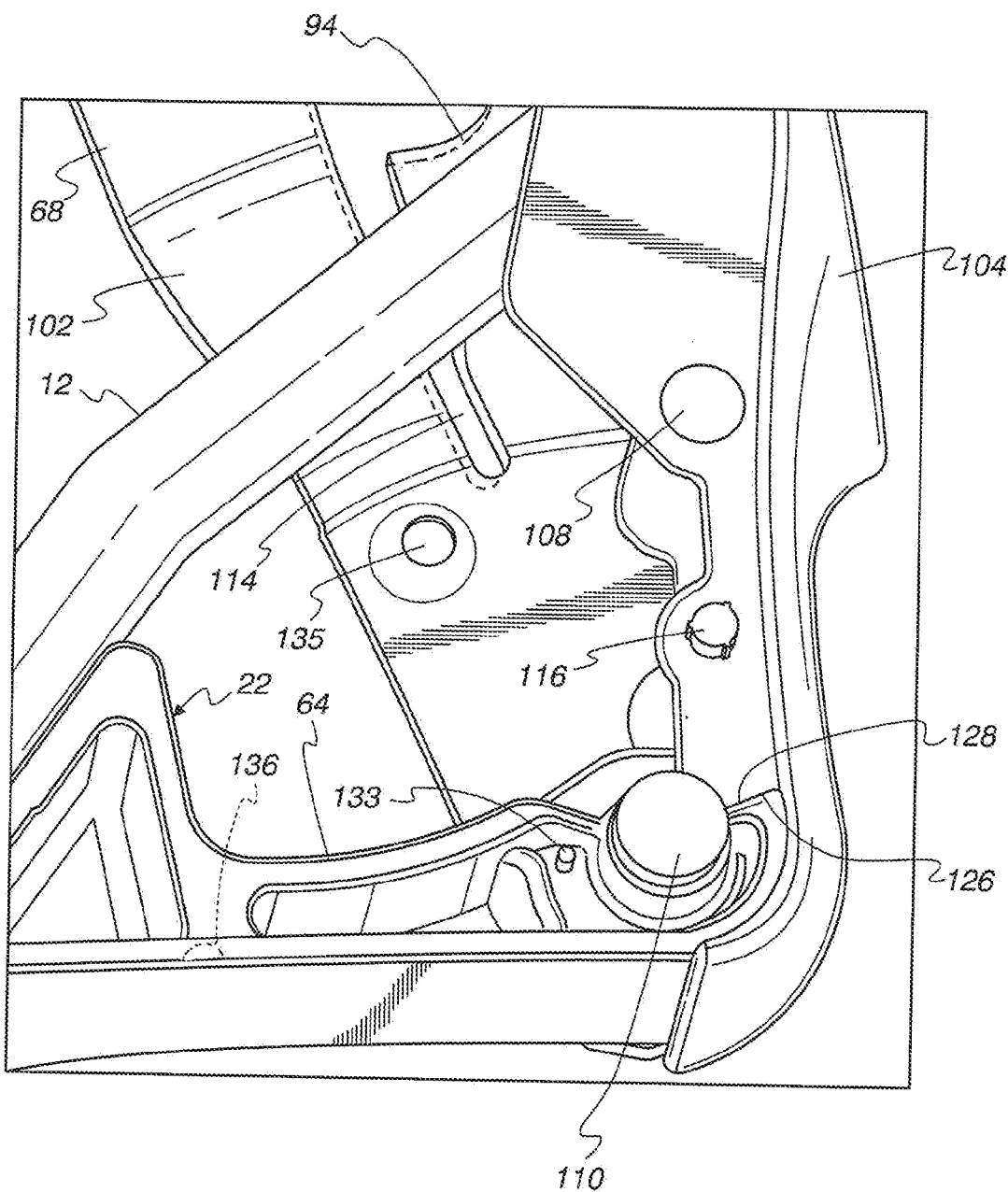
FIG. 13 is an enlarged perspective view of the portion encircled by line 13-13 in FIG. 7, with a frame element removed for purposes of illustration.
Figure 14:
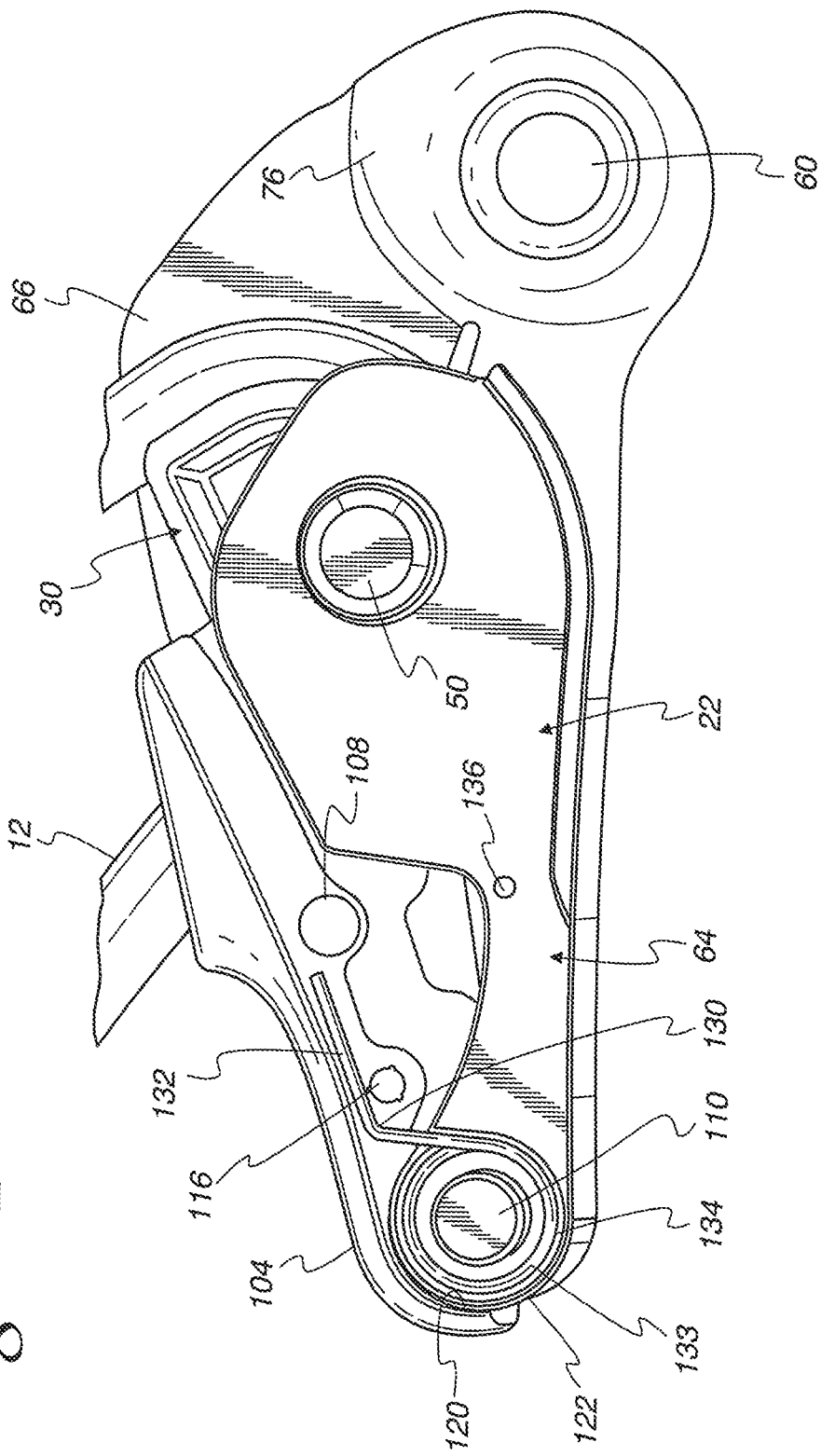
FIG. 14 is a view similar to FIGS. 6 and 9, but taken from the opposite lateral side of the device and with a frame element removed for purposes of illustration.

In addition to being fastened to the frame components 66 and 68 by the rivet 108, the handle component 104 includes a pair of laterally outwardly extending posts or studs 116 (best seen in FIGS. 8 and 14) that are received in closely conforming holes 118 on each of the frame components 66 and 68 (It should be noted that the frame component 66 is not shown in FIGS. 9-13, the frame component 68 is not shown in FIG. 14, and the handle component 104 is not shown in FIGS. 9 and 10, all for purposes of illustration). Additionally, the handle component 104 includes a curved surface 120 that conforms to a curved end portion 122 of the cam carrier 22 that allows the cam carrier 22 to pivot relative to the frame 24 and the handle component 104. The handle component further includes a stop surface 126 that can engage a stop surface 128 on the cam carrier 22 to limit the pivoting motion of the cam carrier 12 towards the open condition, as best seen in FIG. 13. As best seen in FIG. 14, the handle component 104 can also include a slot 130 that receives an end 132 of a torsion spring 133 that is received in a relief 134 in the cam carrier 22 to provide a torsion force between the frame 24 and the cam carrier 22 to urge the cam carrier 22 to the closed condition.

As best seen in FIGS. 13 and 14, frame member 68 can include an opening 135 that aligns with a threaded opening 136 in the cam carrier 22 with the device 14 in the closed condition to allow the optional use of a threaded fastener (not shown) that passes through the opening 135 in the frame member 68 and is threaded into the threaded opening 136 in the cam carrier 22 to lock the device 14 in the closed condition.

As with the embodiment of FIGS. 1-5, the embodiment of FIGS. 6-14, the device 14 can be operated to place the device 14 in the second state and the rope bite 20 in the released position by pivoting the cam carrier 22 relative to the bite cam 30 to move the rope guide surface 28 away from the bite cam 30 with the rope 12 under load, as indicated by the clockwise directed arrow "A" in FIGS. 9 and 10. In this regard, a user may engage the contoured handle component 104 with the user's hand so as to transfer a pivoting force (clockwise in FIGS. 9 and 10) to the lever member 64 to pivot the frame 24 and the cam carrier 22 about a load connector (not shown) received in the connector opening 60.

While any suitable construction can be used, in the illustrated embodiment, the surfaces 28, 34, and 42, the protrusion 74 and the rigid lever member 64 are au part or a one-piece component that can be formed using any suitable technique, such as, for example, by machining from a single block of suitable materials, by forging from a single block of suitable material, or by casting or molding a suitable material into a one-piece component. In this regard, suitable materials for the components of the adjuster device 14 can include metal materials, composite materials, and plastic materials. The most suitable material(s) can be highly dependent upon the parameters of each specific application of the device 14.

It should be appreciated that the disclosed rope adjuster device 14 allows for convenient and fast replacement of the rope 12, without requiring the removal of any load connector that may be received in the connector opening 60 and/or without requiring the removal of any fastener or other component that joins or locks the frame and cam connector together.

It should understood that while some specific forms and constructions for the adjuster device 14 have been illustrated and described herein, there are many possible forms and constructions that fall within the scope of this disclosure. For example, while the frame 24 has been illustrated and described as including two rigid members 66 and 68 that are fixed to each other by the grommet 80, it may be desirable in some applications to provide other constructions for the frame 24 that do not require the joining of separate members. As a further example, while a specific form and construction has been shown for the bite cam 30, it may be desirable in some applications to utilize a different form or construction for the bite cam 30. Accordingly, no specific limitation should be read into any appended claim unless expressly recited in the appended claim.

The invention claimed is:

1. A rope adjuster device for allowing adjustable positioning of a load along a rope extending through the device and providing convenient replacement of the rope, the rope adjuster device comprising:
   a rope bite having a first state wherein a rope extending through the device is gripped to prevent translation of the device along the length of the rope and a second state wherein the device may translate along the length of the rope; the rope bite defined by a rope guide surface and a bite cam that is movable relative to the rope guide surface between a gripping position wherein the rope is gripped between the bite cam and the rope guide surface in the first state and a release position wherein the rope may translate through the bite along the length of the rope in the second state, the rope bite being open on a lateral side to allow loading of the rope into the bite by moving the rope laterally with respect to the length of the rope;
   a cam carrier defining the rope guide surface, the bite cam mounted on the carry carrier for movement between the gripping and release positions;
   a frame defining a connector opening, the frame extending from the connector opening to a pivot location whereat the cam carrier is connected to the frame to pivot relative to the frame between an open position wherein the rope can be loaded from the lateral side into the rope bite and a closed position wherein the lateral side is closed by the frame to prevent removal of the rope from the rope bite; and
   wherein the bite cam is spring biased to pivot toward the gripping position.

2. The device of claim 1 wherein the cam carrier comprises a rigid lever member extending from the bite cam to the pivot location, the lever member operable by a user to place the rope bite in the second state by pivoting the cam carrier relative to the bite cam to move the rope guide surface away from the bite cam with the rope extending through the device and under load.

3. The device of claim 1 wherein the frame comprises a one-piece, rigid member extending from the connector opening to the pivot location.

4. The device of claim 3 wherein the rigid member extends over the lateral side of the rope bite with the cam carrier in the closed position.

5. A rope adjuster device for allowing adjustable positioning of a load along a rope extending through the device and providing convenient replacement of the rope, the rope adjuster device comprising:
   a rope bite having a first state wherein a rope extending through the device is gripped to prevent translation of the device along the length of the rope and a second state wherein the device may translate along the length of the rope; the rope bite defined by a rope guide surface and a bite cam that is movable relative to the rope guide surface between a gripping position wherein the rope is gripped between the bite cam and the rope guide surface in the first state and a release position wherein the rope may translate through the bite along the length of the rope in the second state, the rope bite being open on a lateral side to allow loading of the rope into the bite by moving the rope laterally with respect to the length of the rope;
   a cam carrier defining the rope guide surface, the bite cam mounted on the cam carrier for movement between the gripping and release positions;
   a frame defining a connector opening, the frame extending from the connector opening to a pivot location whereat the cam carrier is connected to the frame to pivot relative to the frame between an open position wherein the rope can be loaded from the lateral side into the rope bite and a closed position wherein, the lateral side is closed by the frame to prevent removal of the rope from the rope bite, the cam carrier being spaced from the connector opening with the cam carrier in the closed position;
   wherein the frame comprises a one-piece, rigid member extending from the connector opening to the pivot location;
   wherein the rigid member extends over the lateral side of the rope bite with the cam carrier in the closed position; and
   wherein the frame comprises another rigid member extending from the connector opening to the pivot location, the rigid members extending over opposite lateral sides of the cam carrier with the cam carrier in the closed position.

6. The device of claim 5 wherein the cam carrier comprises a protrusion extending outwardly beyond the rigid members with the cam carrier in the closed position, the protrusion engageable by a user to move the carrier from the closed position toward the open position.

7. The device of claim 5 wherein the rigid members define rope conforming surfaces adjacent the connector opening to guide the rope past the frame when the cam carrier is moved from the open position to the closed position with the rope loaded into the bite cam.

8. The device of claim 5 wherein the rigid members are fixed to each other at the connector opening.

9. The device of claim 8 further comprising a grommet defining the connector opening and fixing the rigid members to each other.

10. A rope adjuster device for allowing adjustable positioning of a load along a rope extending through the device and providing convenient replacement of the rope, the rope adjuster device comprising:

a rope bite having a first state wherein a rope extending through the device is gripped to prevent translation of the device along the length of the rope and a second state wherein the device may translate along the length of the rope; the rope bite defined by a rope guide surface and a bite cam that is movable relative to the rope guide surface between a gripping position wherein the rope is gripped between the bite cam and the rope guide surface in the first state and a release position wherein the rope may translate through the bite along the length of the rope in the second state, the rope bite being open on a lateral side to allow loading of the rope into the bite by moving the rope laterally with respect to the length of the rope;

a cam carrier defining the rope guide surface, the bite cam mounted on the cam carrier for movement between the gripping and release positions;

a frame defining a connector opening, the frame extending from the connector opening to a pivot location whereat the cam carrier is connected to the frame to pivot relative to the frame between an open position wherein the rope can be loaded from the lateral side into the rope bite and a closed position wherein the lateral side is closed by the frame to prevent removal of the rope from the rope bite; and wherein the cam carrier is spring biased to the closed position.

11. A rope adjuster device for allowing adjustable positioning of a load along a rope extending through the device and providing convenient replacement of the rope, the rope adjuster device comprising:

a rope bite having a first state wherein a rope extending through the device is gripped to prevent translation of the device along the length of the rope and a second state wherein the device may translate along the length of the rope; the rope bite defined by a rope guide surface and a bite cam that, is movable relative to the rope guide surface between a gripping position wherein the rope is gripped between the bite cam and the rope guide surface in the first state and a release position wherein the rope may translate through the bite along the length of the rope in the second state, the rope bite being open on a lateral side to allow loading of the rope into the bite by moving the rope laterally with respect to the length of the rope;

a cam carrier defining the rope guide surface, the bite cam mounted on the cam carrier for movement between the gripping and release positions;

a frame defining a connector opening, the frame extending from the connector opening to a pivot location whereat the cam carrier is connected to the frame to pivot relative to the frame between an open position wherein the rope can be loaded from the lateral side into the rope bite and a closed position wherein the lateral side is closed by the frame to prevent removal of the rope from the rope bite; and further comprising a spring extending between the frame and the cam carrier at the pivot location to bias the cam carrier to the closed position.

12. The device of claim 1 wherein the connector opening is spaced further from the pivot location than the bite cam.

13. The device of claim 1 in combination with the rope extending through the device and engaged in the rope bite.

* * * * *